United States Patent [19]
Schaffer, Jr.

[11] Patent Number: 4,524,406
[45] Date of Patent: Jun. 18, 1985

[54] COMPACT LASER SIMULATOR

[75] Inventor: James R. Schaffer, Jr., Huntsville, Ala.

[73] Assignee: The Boeing Company, Seattle, Wash.

[21] Appl. No.: 515,206

[22] Filed: Jul. 20, 1983

[51] Int. Cl.³ .................................................. F21V 7/04
[52] U.S. Cl. ...................................... 362/32; 362/230; 362/231; 362/249; 362/250; 362/259; 362/269; 362/285; 362/320; 362/362; 362/375; 362/800; 356/5; 434/4

[58] Field of Search ................. 362/32, 230, 231, 249, 362/250, 259, 269, 285, 320, 362, 800, 375; 356/5, 72, 73; 434/4; 250/553

[56] References Cited
U.S. PATENT DOCUMENTS
4,309,746  1/1982  Rushworth .......................... 362/259

Primary Examiner—Stephen J. Lechert, Jr.
Attorney, Agent, or Firm—Edwin H. Crabtree

[57] ABSTRACT

An eye-safe compact laser simulator for simulating a laser spot on or off axis. The simulator used to test laser range and spot receivers.

9 Claims, 2 Drawing Figures

COMPACT LASER SIMULATOR

BACKGROUND OF THE INVENTION

This invention relates to a laser simulator more particularly but not by way of limitation to an eye-safe compact laser simulator using diodes for simulating a laser spot on and off axis.

Heretofore, there have been various developments in both military and commerical environments concerning laser range receivers and laser spot receivers. It is required to have the laser simulators as a safe, convenient and economical means for accurate testing both on and off axis parameters of these receivers. Prior to the subject invention there were only large, costly and difficult to use apparatus. In addition, the prior art devices included large optical systems which generally reduced the quantity of radiation impinged on the receiver under test. Also there have been other types of laser range simulators and laser spot simulators which have proven to be costly in the field and considered dangerous.

The following United States patents describe various types of optical and laser test apparatus. They are U.S. Pat. No. 3,334,217 to Bickler et al., U. S. Pat. No 3,857,042 to LaGrange et al., U.S. Pat. No. 4,309,746 to Rushworth, U.S. Pat. No. 4,337,502 to Lescrenier and U.S. Pat No. 4,338,547 to McCaslin. None of these prior art patent specifically disclose the unique features and advantages of the subject compact laser simulator.

SUMMARY OF THE INVENTION

The subject invention is a compact device designed to simulate a laser spot on axis and off axis for testing laser range receivers and laser spot receivers.

The compact laser simulator provides-eye-safe diode emitters as an optical source.

The laser simulator is characterized by having diodes and electronics which are attached to a circular mounting plate which rotates about an optical axis. This feature allows an "on" axis diode to remain stationary with respect to the optical axis, while "off" axis diodes mounted on the plate can be positioned at any quadrant required, thus eliminating unnecessary optical sources in a cost effective manner.

The subject eye-safe compact laser simulator simulates a laser sopt on and off axis and includes a stationary mount having an electrical power source connected thereto. A cylindrical electronic control housing is rotatably attached to the mount and the power source. The housing includes electronic controls therein. An optical diode mounting plate is attached to the front of the control housing with an "on" axis diode mounted in the center thereof and along a Z axis through the center of the control housing. A plurality of "off" axis diodes are mounted along an X axis in the mounting plate and in a spaced relationship to the "on" axis diode.

The advantages and objects of the invention will become evident from the following detailed description of the drawings when read in connection with the accompanying drawings which illustrate preferred embodiments of the invention.

DETAILED DESCRIPTION OF THE DRAWINGS

Figure 1:
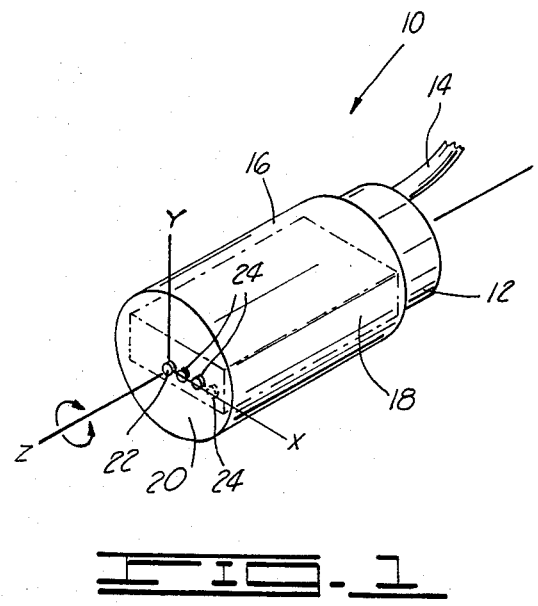
FIG. 1 illustrates a perspective view of the compact laser simulator.

In FIG. 1 the eye-safe compact laser simulator is designated by general reference numeral 10. The simulator 10 includes a stationary rear mount 12 having an electrical power source received through a pigtail 14. A cylindrical electronic control housing 16 is rotatably mounted to the rear mount 12 and includes electronic controls 18 which are state of the art controls stored inside the housing 16 and shown in dotted lines. These controls 18 are connected to the power source 14.

Mounted on front of the housing 16 is an X-Y diode mounting plate 20 having an X axis and Y axis. Disposed along a Z axis extending along the length of the housing 16 and centered thereon is an "on" axis diode 22 connected to the electronic controls 18. Disposed along the length of the X axis and in a spaced relationship to each other and the "on" axis diode 22 are a plurality of "off" axis diodes 24 which may be rotated into any quadrant in the X-Y plane of the mounting plate 20.

The electronic controls 18 utilizes frequency, amplitude and nanosecond pulse width controls to satisfy a particular system under test. Amplitude control allows testing to determine AGC level response, while pulse width control enables testing to determine whether or not the particular system ignores an invalid signal. The current control capabilities, i.e. amplitude, allows interchanging diodes of different wave lengths in order to satisfy the requirements of a multitude of systems.

Figure 2:
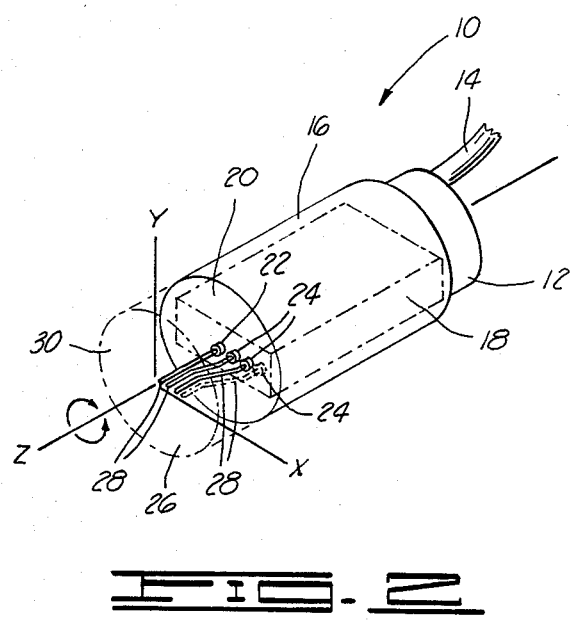
FIG. 2 illustrates a perspective view of the laser simulator including the additional feature of fiber optic pigtails connected to the "on" and "off" axis diodes.

In FIG. 2 an alternate embodiment of the simulator 10 is shown having an extension 26 shown in dotted lines and mounted in front of and parallel axis the X-Y plane of the mounting plate 20. The extension 26 provides for receiving a plurality of fiber optic pigtails 28. The fiber optic pigtails 28 allow for more narrow spacing of "off" axis angles which may be required in the testing of the laser range and spot receivers. The output of the fiber optic pigtails 28 are located in a focal plane 30 of the extension 26 in the same manner as described in FIG. 1. It can be appreciated that these pigtails 28 can be connected to the "on" axis diode 22 and "off" axis diodes 24 as shown. In addition, the pigtails 28 can be fusion spliced in order to input different sources of wave lengths.

Changes may be made in the construction and arrangement of the parts or elements of the embodiments as described herein without departing from the spirit or scope of the invention defined in the following claims.

What is claimed is:

1. A compact laser simulator for simulating a laser spot on or off axis when testing laser range and spot receivers and the like, the simulator comprising:

a stationary mount having an electrical power source connected thereto;

an electronic control housing rotatably attached to the mount and the power source, the housing having electronic controls therein;

a light source mounting plate attached to the front of the control housing;

an "on" axis light source mounted in the center of the mounting plate; and at least one "off" axis light source mounted on the mounting plate and in a spaced relationship to the "on" axis light source, the "on" axis and "off" axis light sources connected to the electronic controls.

2. The simulator as described in claim 1 wherein the "on" light source and "off" axis light source are diodes.

3. The simulator as described in claim 1 wherein the mounting plate defines an X and Y axis and the mounting plate and control housing rotate about a Z axis, the "on " axis light source centered on the Z axis.

4. The simulator as described in claim 3 further including a plurality of "off" axis light sources disposed in a spaced relationship to each other and the "on" axis light source along the X axis.

5. A compact laser simulator for simulating a laser spot on or off axis when testing laser range and spot receivers and the like, the simulator comprising:
 a stationary rear mount having an electrical power source connected thereto;
 an elongated electronic control housing rotatably mounted at one end to the rear mount and electrical power source and along a Z axis through the center of the elongated control housing, the housing having electronic controls therein;
 an light source mounting plate attached to the other end of the control housing, the mounting plate defining a X, Y focal plane;
 an "on" axis eye-safe light source mounted in the center of the mounting plate and on the Z axis;
 a plurality of "off" axis eye-safe light sources mounted on the mounting plate and in a spaced realtionship to each other and the "on" axis light source, the "off" axis light sources and "on" axis light source connected to the electonic controls in the housing.

6. The simulator as described in claim 5 wherein the "on" axis light source and "off" axis sources are diodes.

7. The simulator as described in claim 5 wherein the "on" axis light source and the "off" axis light sources are connected to fiber optic pigtails located in the focal plane defined by the X and Y axis of the mounting plate.

8. A compact laser simulator for simultating a laser spot on or off axis when testing laser range and spot receivers or the like, the simulator comprising:
 a stationary rear mount having an electrical power source connected thereto;
 an elongated housing rotatably mounted at one end to the rear mount and the power source and along a Z axis through the center of the housing, a diode mounting plate attached to the other end of the housing, the plate defining an X, Y focal plane;
 an "on" axis diode mounted in the center of the mounting plate and on the Z axis;
 a plurality of "off" axis diodes mounted on the mounting plate and along the X axis and in a spaced relationship to each other and the "on" axis diode.

9. The simulator as described in claim 8 further including fiber optic pigtails connected to the "on" axis and "off" axis diodes for providing a more narrow spacing along the focal plane of the mounting plate.

* * * * *